(12) United States Patent
Darwhekar et al.

(10) Patent No.: US 8,249,524 B2
(45) Date of Patent: Aug. 21, 2012

(54) TRANSMIT AND RECEIVE PERFORMANCE OF A NEAR FIELD COMMUNICATION DEVICE THAT USES A SINGLE ANTENNA

(75) Inventors: Yogesh Darwhekar, Bhopal (IN); Alok Prakash Joshi, Thane (IN); Gireesh Rajendran, Trivandrum (IN); Subhashish Mukherjee, Bangalore (IN); Apu Sivadas, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 98 days.

(21) Appl. No.: 12/879,008

(22) Filed: Sep. 10, 2010

(65) Prior Publication Data

US 2012/0064826 A1    Mar. 15, 2012

(51) Int. Cl.
*H04B 1/44* (2006.01)

(52) U.S. Cl. ............. 455/78; 455/82; 455/83; 455/41.1; 343/853

(58) Field of Classification Search .................... 455/78, 455/82, 83, 41.1, 193.1, 195.1, 197.3, 197.2; 343/853
See application file for complete search history.

(56) References Cited

U.S. PATENT DOCUMENTS

| | | | | |
|---|---|---|---|---|
| 6,961,368 B2 * | 11/2005 | Dent et al. | .................... | 375/219 |
| 7,505,790 B2 * | 3/2009 | Chang et al. | ................ | 455/562.1 |
| 7,512,383 B2 * | 3/2009 | Essabar et al. | .................. | 455/78 |
| 7,535,296 B2 * | 5/2009 | Bulkes et al. | .................. | 330/10 |
| 7,769,466 B2 * | 8/2010 | Denker et al. | .................. | 607/61 |
| 8,103,221 B2 * | 1/2012 | Ta et al. | ........................... | 455/81 |
| 2005/0111682 A1 * | 5/2005 | Essabar et al. | ................. | 381/315 |
| 2006/0276132 A1 * | 12/2006 | Sheng-Fuh et al. | .......... | 455/41.2 |
| 2008/0030419 A1 * | 2/2008 | Sjoblom | ........................ | 343/853 |
| 2009/0298443 A1 * | 12/2009 | Ta et al. | ........................ | 455/83 |
| 2010/0190435 A1 * | 7/2010 | Cook et al. | ................... | 455/41.1 |
| 2011/0105055 A1 * | 5/2011 | Ilkov | .............................. | 455/93 |

* cited by examiner

*Primary Examiner* — Minh D Dao
(74) *Attorney, Agent, or Firm* — Alan A. R. Cooper; Wade James Brady, III; Frederick J. Telecky, Jr.

(57) ABSTRACT

A near field communication (NFC) transceiver contains a transmitter portion to generate a transmit wireless signal, and a receiver portion to receive and process a receive wireless signal. The circuit further contains a shunt capacitor, a switch, and an antenna interface to couple the transmitter portion and the receiver portion to an antenna designed to communicate with external antennas by inductive coupling. The switch couples the shunt capacitor in parallel with the antenna in one operational mode, and decouples the shunt capacitor from the antenna in another operational mode. Transmit and receive performance of the NFC transceiver are enhanced as a result.

8 Claims, 3 Drawing Sheets

US 8,249,524 B2

TRANSMIT AND RECEIVE PERFORMANCE OF A NEAR FIELD COMMUNICATION DEVICE THAT USES A SINGLE ANTENNA

BACKGROUND OF THE INVENTION

1. Technical Field

Embodiments of the present disclosure relate generally to wireless communication devices, and more specifically to improving transmit and receive performance of a near field communication device.

2. Related Art

Near field communication (NFC) generally refers to short range (of the order of a few centimeters) wireless communication technology that enables exchange of data between two or more near field communication devices, typically by inductive coupling. Inductive coupling refers to the generation of voltage/current in one coil due to (and proportional to) a change in voltage/current (and hence the corresponding magnetic field) in another coil, the two coils being termed as being "inductively coupled" to each other (and which may thus be viewed as 'antennas'). Currently, NFC communication is standardized and designed to operate within the globally available and unlicensed radio frequency ISM band of 13.56 MHz.

A NFC device may contain both transmitter and receiver circuitry (the respective transmitter and receiver circuitry being operational in corresponding operational durations termed transmit and receive intervals), and may employ a same antenna for both transmission and reception of NFC signals. Transmit performance of a NFC device is generally a measure of the power of the signals transmitted by the device in the transmit mode (and thus the effective communication range of the transmitter) corresponding to factors such as, a desired efficiency for the device and power supply voltage used in one or more portions (e.g., power amplifier) of the transmitter. Receive performance of a NFC device is generally a measure of the lowest received signal power that the receive circuitry in the NFC device is designed to operate with (also termed sensitivity), to reliably extract the information contained in the received signal.

Several embodiments described below are directed to improving transmit and receive performance of a near field communication device that uses a single antenna for both transmission and reception.

SUMMARY

This Summary is provided to comply with 37 C.F.R. §1.73, requiring a summary of the invention briefly indicating the nature and substance of the invention. It is submitted with the understanding that it will not be used to interpret or limit the scope or meaning of the claims.

A circuit in a transceiver contains a transmitter portion to generate a transmit wireless signal, and a receiver portion to receive and process a receive wireless signal. The circuit further contains a shunt capacitor, a switch, and an antenna interface to couple the transmitter portion and the receiver portion to an antenna designed to communicate with external antennas by inductive coupling. The switch couples the shunt capacitor in parallel with the antenna in one operational mode, and decouples the shunt capacitor from the antenna in another operational mode.

Several aspects of the invention are described below with reference to examples for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well-known structures or operations are not shown in detail to avoid obscuring the features of the invention.

BRIEF DESCRIPTION OF THE VIEWS OF DRAWINGS

Example embodiments of the present invention will be described with reference to the accompanying drawings briefly described below.

The drawing in which an element first appears is indicated by the leftmost digit(s) in the corresponding reference number.

DETAILED DESCRIPTION

Various embodiments are described below with several examples for illustration.

1. Example Device

Figure 1:
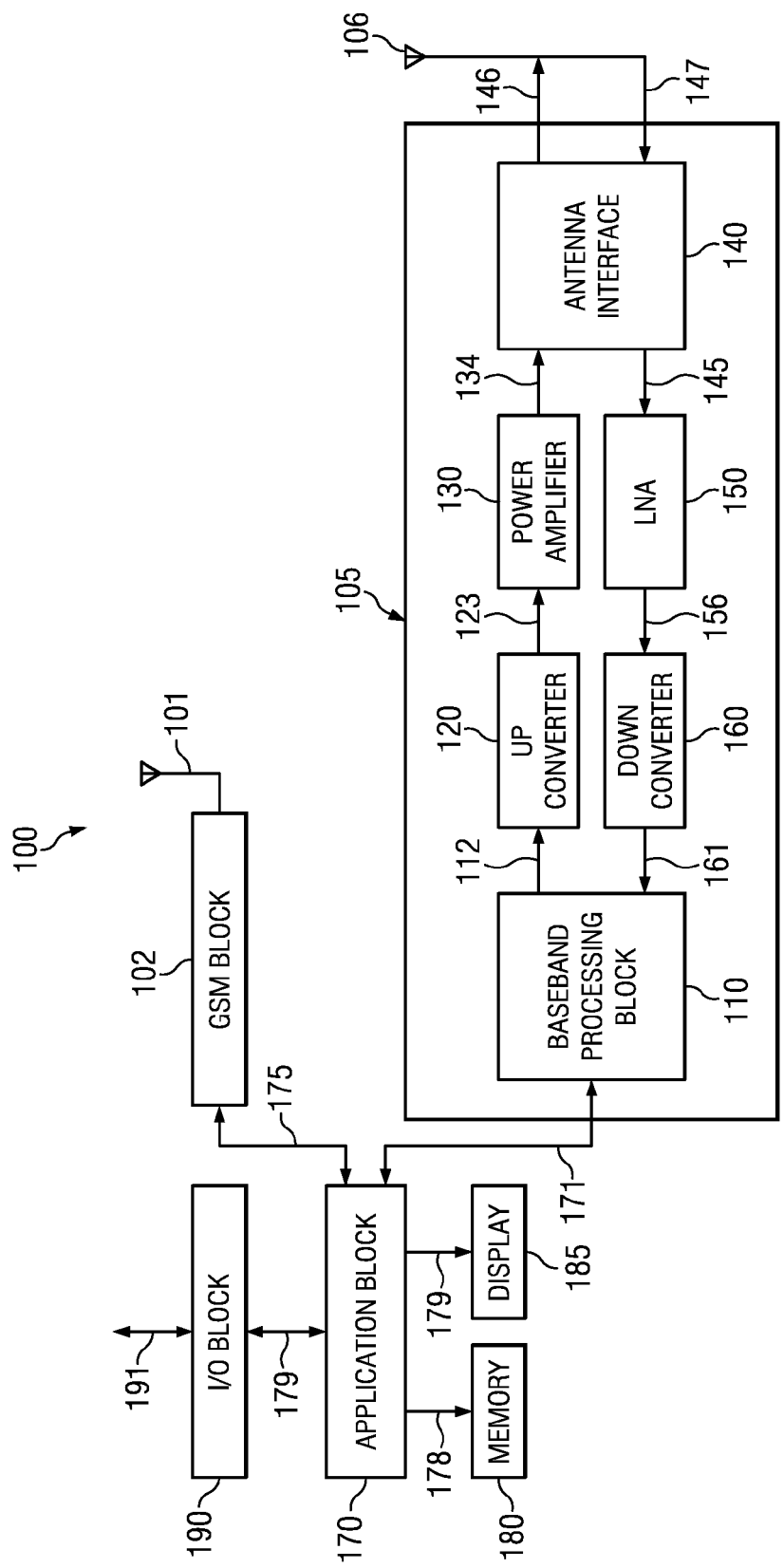
FIG. 1 is a block diagram of an example device in which several embodiments can be implemented.

FIG. 1 is a block diagram of an example device in which several embodiments may be implemented. The block diagram shows mobile phone 100, which is in turn shown containing a Global System for Mobile Communication (GSM) block 102, a Near Field Communication (NFC) transceiver 105, input/output (I/O) block 190, application block 170, memory 180 and display 185. The components/blocks of mobile phone 100 in FIG. 1 are shown merely by way of illustration. However, mobile phone 100 may contain more or fewer components/blocks. Further, although described as using GSM technology, mobile phone may instead be implemented using other technologies such as CDMA (Code Division Multiple Access) also. The blocks of FIG. 1 may be implemented in integrated circuit (IC) form. Alternatively, some of the blocks may be implemented in IC form, while other blocks may be in discrete form.

GSM block 102 is shown connected to antenna 101, and operates to provide wireless telephone operations in a known way. GSM block 102 may contain receiver and transmitter sections internally (not shown) to perform the corresponding receive and transmit operations.

NFC transceiver 105 uses inductive coupling for wireless communication, and is shown containing baseband processing block 110, up-converter block 120, power amplifier 130, antenna interface 140, Low-Noise Amplifier (LNA) 150, and down-converter 160.

NFC transceiver 105 may operate consistent with specifications described in Near Field Communication Interface and Protocol-1 (NFCIP-1) and Near Field Communication Interface and Protocol-2 (NFCIP-2) and standardized in ECMA-340, ISO/IEC 18092, ETSI TS 102 190, ISO 21481, ECMA 352, ETSI TS 102 312, etc.

Baseband processing block 110 (baseband processor) may receive data (information) to be transmitted, on path 171 from application block 170, and operates to generate NFC signals at baseband. The generation of the NFC signals may include operations such as modulation, digital-to-analog (D/A) conversion, etc. Baseband processing block 110 provides the baseband NFC signals to up-converter 120 on path 112. Baseband processing block 110 receives down-converted NFC signals on path 161, operates to extract data contained in the received down-converted NFC signals, and may employ operations such as analog-to-digital (A/D) conversion, demodulation, error correction checks, etc. Baseband processing block 110 may forward the extracted data on path 171 to application block 170.

Up-converter 120 converts the baseband NFC signals received on path 112 to a higher frequency band consistent with the relevant NFC standard(s) noted above, and provides the up-converted NFC signals to power amplifier 130 via path 123.

Power amplifier 130 provides power amplification to the up-converted NFC signals on path 123, and provides power-amplified NFC signals to antenna 106 via paths 134, antenna interface 140 and path 146. Antenna 106 transmits (in corresponding transmit intervals) NFC signals received on path 146 by inductive coupling. Antenna 106 (NFC antenna) receives (in corresponding receive intervals) NFC signals (from another NFC-capable device (not shown)), and provides the received NFC signals to LNA 150 via path 147, antenna interface 140 and path 145.

LNA 150 provides front-end amplification to received NFC signals on path 145, and provides the amplified signals via path 156 to down-converter 160. Down-converter 160 converts the signals received on path 156 to baseband, and provides baseband NFC signals on path 161 to baseband processing block 110.

Application block 170 may contain corresponding hardware circuitry (e.g., one or more processors), and operates to provide various user applications provided by mobile phone 100. The user applications may include voice call operations, data transfers, etc. Application block 170 may operate in conjunction with GSM block 102 to provide such features, and communicates with GSM block 102 via path 175.

Display 185 displays images in response to the corresponding display signals received from application block 170 on path 179. The images may be generated by a camera provided in mobile phone 100, but not shown in FIG. 1. Display 185 may contain memory (frame buffer) internally for temporary storage of pixel values for image refresh purposes, and may be implemented, for example, as a liquid crystal display screen with associated control circuits. I/O block 190 provides a user with the facility to provide inputs via path 191, for example, to dial numbers. In addition I/O block 190 may provide on path 191 outputs that may be received via application block 170. I/O block 190 communicates with application block 170 via path 179.

Memory 180 stores program (instructions) and/or data (provided via path 178) used by applications block 170, and may be implemented as RAM, ROM, flash, etc, and thus contains volatile as well as non-volatile storage elements.

Transmitter circuits (e.g., modulator, D/A converter) of baseband processing block 110, up-converter block 120, and power amplifier 130 constitute the transmitter portion of NFC transceiver 105. Receiver circuits (e.g., demodulator, A/D converter) of baseband processing block 110, down-converter 160, and LNA 150 constitute the receiver portion of NFC transceiver 105.

Antenna 106 communicates with external antennas by inductive coupling, and is used for both transmission and reception of NFC signals. Transmission and reception of NFC signals by NFC transceiver 105 may be performed in a time division multiplexed (TDM) manner. Accordingly, a time interval in which NFC transceiver 105 transmits NFC signals is termed a transmit interval, and the corresponding mode of operation of NFC transceiver 105 may be viewed as a 'transmit mode' or "NFC reader transmit mode". Similarly, a time interval in which NFC transceiver 105 receives NFC signals is termed a receive interval, and the corresponding mode of operation of NFC transceiver 105 may be viewed as a 'receive mode' or "NFC tag receive mode".

Assuming all blocks of FIG. 1 are implemented in IC form, antenna interface 140 may correspond to transmit and receive pins of the IC on which NFC transmit are output and receive signals are to be input. Alternatively, antenna interface 140 may be viewed as including the transmit and receive pins as well as components (e.g., resistors, capacitors, etc.) that may be connected external to the IC and connected to the transmit and/or receive pins. Antenna interface 140, in conjunction with a switch and a capacitor, is designed to improve the transmit and receive performance of NFC transceiver 105, as described in sections below.

2. Improving Transmit and Receive Performance

Figure 2:
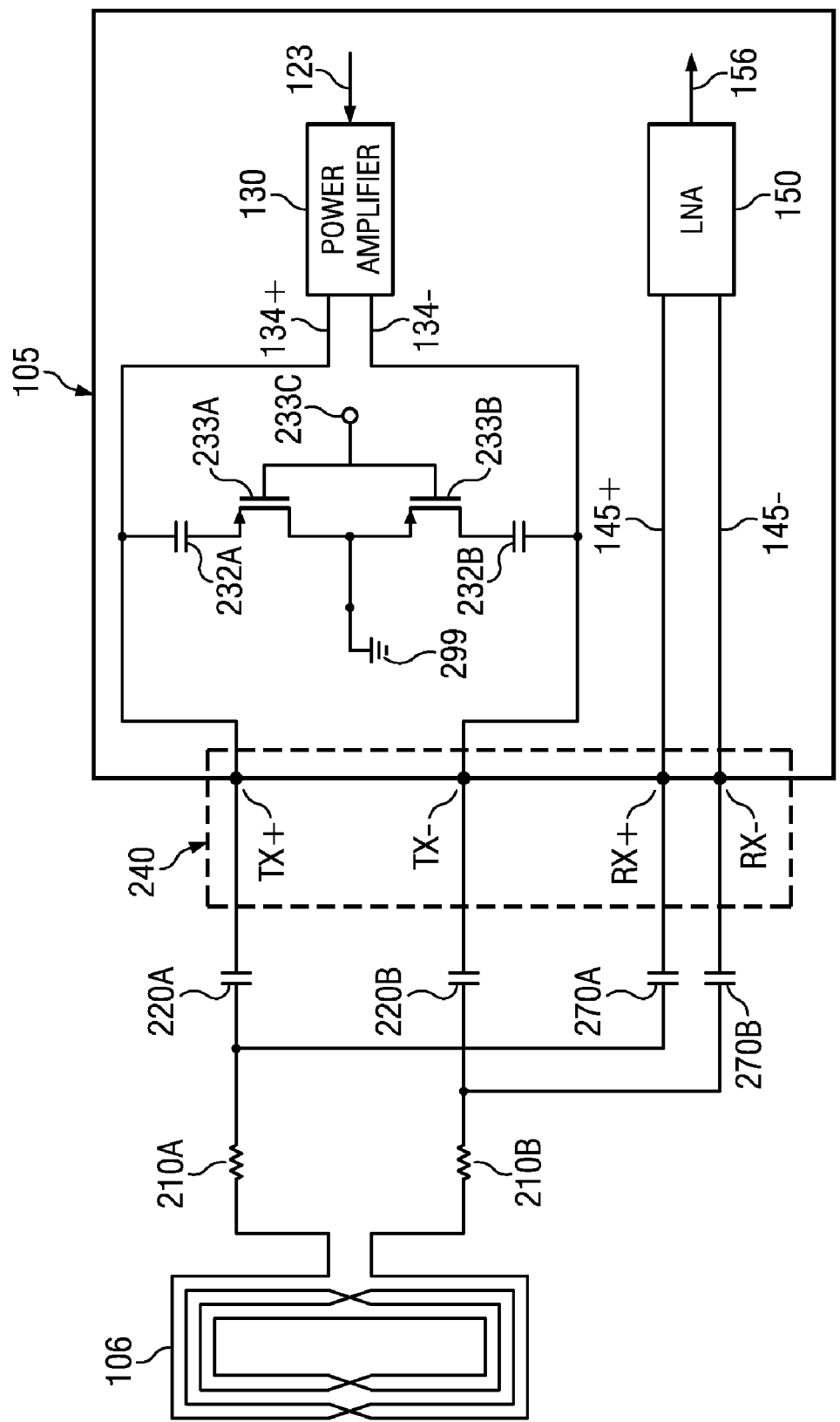
FIG. 2 is a diagram illustrating circuit connections between an antenna and corresponding transmit and receive components of a NFC transceiver, in an embodiment.

FIG. 2 is a diagram illustrating circuit connections to an antenna in a NFC transceiver for improving its transmit and receive performance, in an embodiment. FIG. 2 is shown containing antenna 106, resistors 210A and 210B, capacitors 220A, 220B, 270A, 270B, 232A and 232B, switches 233A and 233B, power amplifier 130 and LNA 150. In FIG. 2, antenna interface 140 corresponds to block 240 (shown in dotted lines) and contains transmit pins TX+ and TX− and receive pins RX+ and RX− of NFC transceiver 105, which may be implemented as an IC. Antenna interface 140 may in the alternative be viewed as including block 240 as well as resistors 210A and 210B, and capacitors 220A, 220B, 270A and 270B. Capacitors 232A and 232B may be termed 'shunt' capacitors, while capacitors 220A and 220B may be termed 'series' capacitors.

Antenna 106 may be designed as a multi-loop coil (implemented for example, as a planar spiral inductor). Paths 134 and 145 of FIG. 1 correspond respectively to differential paths/terminals 134+/134− and 145+/145−. Differential terminals 134+/134− also correspond to terminals TX+/TX− marked in FIG. 2. Differential terminals 145+/145− also correspond to terminals RX+/RX− marked in FIG. 2. Signal paths in FIG. 2 are assumed to be differential. However, the techniques described below can be applied, with corresponding modifications, to circuits that are designed to have single-ended signal paths as well.

In an embodiment, switches 233A and 233B are implemented as P-Channel Metal-Oxide-Semiconductor-Field-Effect-Transistor (PMOS) transistors. ON and OFF states of transistors 233A and 233B are controlled by the voltage level of a control signal applied on control terminal 233C. The control signal may be provided by baseband processing block 110 or application block 170 via corresponding paths, not shown. As shown in FIG. 2, the junction of transistors 233A and 233B is connected to ground 299 (constant reference potential).

Figure 3A:
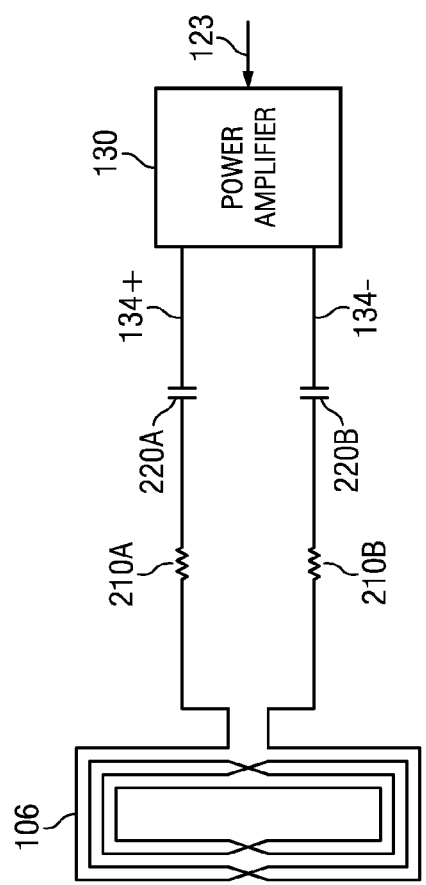
FIG. 3A is a diagram showing the circuit connections of a series resonant circuit formed in a transmit interval of a NFC transceiver, in an embodiment.

In operation, in a transmit interval of NFC transceiver 105, control terminal 233C (which is connected to the gate terminals of each of transistors 233A and 233B) is driven to logic high, thereby switching-off PMOS transistors 233A and 233B. As a result, shunt capacitors 232A and 232B are disconnected from the circuit of FIG. 2. The relevant circuit connections from power amplifier 130 to antenna 106 in a transmit interval are shown in FIG. 3A. Series capacitors 220A and 220B, and the inductance represented by antenna 106 form a series circuit. The capacitances of capacitors 220A and 220B are implemented with values such that the series circuit resonates at the center frequency (13.56 MHz) of the band of frequencies (signal band) occupied by the NFC signals output by power amplifier 130. Due to the series resonance, current in antenna 106 is maximized (for a given output voltage across terminals 134+ and 134−, which may be constrained by the specific technology (e.g., CMOS— Complementary-Symmetry Metal Oxide Semiconductor) used to implement power amplifier 130).

Figure 3B:
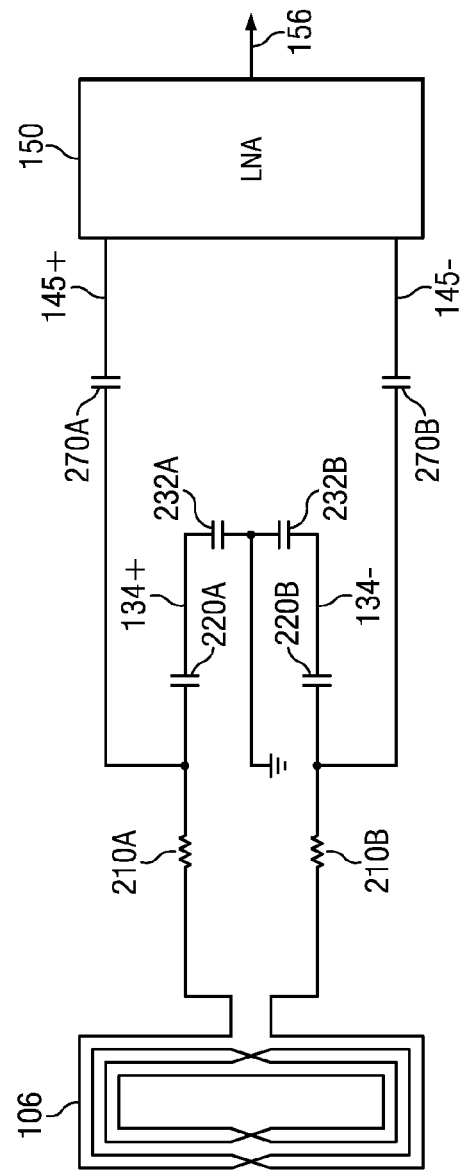
FIG. 3B is a diagram showing the circuit connections of a shunt resonant circuit formed in a receive interval of a NFC transceiver, in an embodiment.

During a receive interval of NFC transceiver 105, control terminal 233C is driven to logic low, thereby turning-ON PMOS transistors 233A and 233B. As a result, shunt capacitors 232A and 232B are connected between terminals 134+ and 134− in the circuit of FIG. 2. The relevant circuit connections from antenna 106 to LNA 150 in a receive interval are shown in FIG. 3B. Capacitors 232A and 232B and the inductance represented by antenna 106 form a shunt circuit. The capacitances of capacitors 232A and 232B are implemented with values such that the shunt circuit resonates at the center frequency (13.56 MHz) of the NFC signal band. Due to the shunt resonance, the voltage developed across terminals 145+ and 145− (which correspond to input terminals of the receiver portion of NFC transceiver 105) is maximized (for a given current induced in antenna 106 by a NFC signal received by antenna 106), thereby maximizing sensitivity of the receiver portion of NFC transceiver 105. Capacitors 270A and 270B are used to protect LNA 150 from being overstressed during a transmit interval of NFC transceiver 105.

Resistors 210A and 210B increase the bandwidth of the series resonant circuit and shunt resonant circuit (shown in FIGS. 3A and 3B respectively), thereby ensuring that variations in values of capacitors 220A, 220B, 232A, 232B and inductance of antenna 106 do not adversely affect the transmit or receive performances of NFC transceiver 105.

According to a prior implementation, capacitors 232A and 232B are connected permanently without the use of a switch to connect/disconnect the capacitors in the corresponding receive/transmit interval, leading to degradation in transmit performance due to the presence of the shunt capacitors.

It may be appreciated from the circuits of FIGS. 2 and 3A that the use of switches 233A and 233B to disconnect capacitors 232A and 232B from the circuit of FIG. 2 ensures that capacitors 232A and 232B do not affect the series resonant circuit (shown in FIG. 3A) in transmit intervals of NFC transceiver 105, and thereby enable maximization of the current generated in the antenna in transmit intervals of NFC transceiver 105. In receive intervals of NFC transceiver 105, the connection of capacitors 232A and 232B across terminals 134+ and 134− optimizes operation of the receiver portion of NFC transceiver 105 (increases sensitivity of the receiver portion) due to the formation of a shunt resonant circuit (as noted above). Thus, the circuit configuration of FIG. 2 and the corresponding operations improve the transmit and receive performance of NFC transceiver 105.

In the illustrations of FIGS. 1, 2, 3A and 3B, though terminals/nodes are shown with direct connections to various other terminals, it should be appreciated that additional components (as suited for the specific environment) may also be present in the path, and accordingly the connections may be viewed as being electrically coupled to the same connected terminals.

The circuit topologies of FIGS. 2, 3A and 3B are merely representative. Various modifications, as suited for the specific environment, without departing from the scope and spirit of several aspects of the present invention, will be apparent to one skilled in the relevant arts by reading the disclosure provided herein. It should be appreciated that the specific type of transistors (such as NMOS, PMOS, etc.) noted above are merely by way of illustration. However, alternative embodiments using different configurations and transistors will be apparent to one skilled in the relevant arts by reading the disclosure provided herein. For example, the PMOS transistors may be replaced with NMOS (N-type MOS) transistors, while also interchanging the connections to power and ground terminals.

Accordingly, in the instant application, the power and ground terminals are referred to as constant reference potentials, the source (emitter) and drain (collector) terminals of transistors (though which a current path is provided when turned on and an open path is provided when turned off) are termed as current terminals, and the gate (base) terminal is termed as a control terminal.

While various embodiments of the present invention have been described above, it should be understood that they have been presented by way of example only, and not limitation. Thus, the breadth and scope of the present invention should not be limited by any of the above-described embodiments, but should be defined only in accordance with the following claims and their equivalents.

What is claimed is:

1. A circuit comprising:
    an antenna interface to couple to an antenna designed to communicate with external antennas by inductive coupling;
    a transmitter portion to generate a transmit wireless signal to be transmitted by the antenna;
    a shunt capacitor;
    a receiver portion to receive and process a receive wireless signal from the antenna; and
    a switch operable in a first mode and a second mode,
    wherein the switch couples the shunt capacitor in parallel with the antenna in the second mode,
    the switch decoupling the shunt capacitor from the antenna in the first mode,
    wherein the transmitter portion is designed to transmit the transmit wireless signal in a transmit interval, and the receiver portion is designed to receive the receive wireless signal from the antenna in a receive interval,
    wherein the switch is operable in the first mode in the transmit interval and in the second mode in the receive interval,
    whereby the switch couples the shunt capacitor in parallel with the inductance of the antenna to form a shunt resonant circuit in the receive interval to maximize a voltage generated at an input terminal of the receiver portion in the receive interval,
    the switch to decouple the shunt capacitor from the inductance of the antenna in the transmit interval to enable maximization of a current generated in the antenna in the transmit interval.

2. The circuit of claim 1, wherein the transmitter portion and the receiver portion operate according to near field communication (NFC) techniques, wherein the transmit wireless signal and the receive wireless signal are NFC signals.

3. The circuit of claim 2, further comprising:
    a series capacitor coupled in series with the antenna, the combination of the series capacitor and the inductance of the antenna forming a series resonant circuit in the transmit interval to maximize a current through the antenna in the transmit interval.

4. The circuit of claim 3, further comprising:
    a resistor coupled in series with the antenna and the series capacitor, the resistor to increase the bandwidth of the series resonant circuit and the shunt resonant circuit.

5. A device comprising:
an application block to provide one or more user applications based on transmission and reception of near field communications (NFC) signals;
an NFC transceiver; and
an antenna designed to communicate with external antennas by inductive coupling, wherein the NFC transceiver comprises:
an antenna interface to couple to the antenna;
a transmitter portion to generate a transmit wireless signal to be transmitted by the antenna;
a shunt capacitor;
a receiver portion to receive and process a receive wireless signal from the antenna; and
a switch operable in a first mode and a second mode,
wherein the switch couples the shunt capacitor in parallel with the antenna in the second mode, the switch decoupling the shunt capacitor from the antenna in the first mode,
wherein the transmitter portion is designed to transmit the transmit wireless signal in a transmit interval, and the receiver portion is designed to receive the receive wireless signal from the antenna in a receive interval,
wherein the switch is operable in the first mode in the transmit interval and in the second mode in the receive interval,
whereby the switch couples the shunt capacitor in parallel with the inductance of the antenna to form a shunt resonant circuit in the receive interval to maximize a voltage generated at an input terminal of the receiver portion in the receive interval,
the switch to decouple the shunt capacitor from the inductance of the antenna in the transmit interval to enable maximization of a current generated in the antenna in the transmit interval.

6. The device of claim 5, wherein the NFC transceiver further comprises:
a series capacitor coupled in series with the antenna, the combination of the series capacitor and the inductance of the antenna forming a series resonant circuit in the transmit interval to maximize a current through the antenna in the transmit interval.

7. The device of claim 6, wherein the NFC transceiver further comprises:
a resistor coupled in series with the antenna and the series capacitor, the resistor to increase the bandwidth of the series resonant circuit and the shunt resonant circuit.

8. A near field communication (NFC) transceiver comprising:
a baseband processor to generate a transmit baseband NFC signal, the baseband processor also to process a receive baseband NFC signal;
an up-converter to convert the transmit baseband NFC signal to a frequency band specified by the NFC standard to generate a transmit NFC signal;
a power amplifier to receive the transmit NFC signal and to generate a power-amplified NFC signal on a first pair of differential paths;
a low noise amplifier (LNA) to receive an NFC receive signal on a second pair of differential paths, and to generate an amplified receive NFC signal;
a down-converter to convert the amplified receive NFC signal from a frequency band specified by the NFC standard to generate the receive baseband NFC signal; and
an antenna interface, wherein the antenna interface comprises:
a first transistor and a second transistor, the control terminals of each of the first transistor and the second transistor being coupled to the baseband processor, wherein a first current terminal of each of the first transistor and the second transistor is coupled to a reference potential;
first shunt capacitor, wherein a first terminal of the first shunt capacitor is coupled to a first one of the paths in the first pair of differential paths, wherein a second terminal of the first shunt capacitor is coupled to a second current terminal of the first transistor;
a second shunt capacitor, wherein a first terminal of the second shunt capacitor is coupled to a second one of the paths in the first pair of differential paths, the second terminal of the second shunt capacitor being coupled to a second current terminal of the second transistor;
a third capacitor, wherein a first terminal of the third capacitor is coupled to the first one of the paths in the first pair of differential paths;
a first resistor, a first terminal of the first resistor coupled to a second terminal of the third capacitor, a second terminal of the first resistor to couple to a first terminal of an NFC antenna;
a second resistor, a first terminal of the second resistor to couple to a second terminal of the NFC antenna;
a fourth capacitor, a first terminal of the fourth capacitor coupled to the second one of the paths in the first pair of differential paths, a second terminal of the fourth capacitor coupled to a second terminal of the second resistor;
a fifth capacitor, a first terminal of the fifth capacitor coupled to a first one of the paths in the second pair of differential paths, a second terminal of the fifth capacitor coupled to the second terminal of the third capacitor; and
a sixth capacitor, a first terminal of the sixth capacitor coupled to a second one of the paths in the second pair of differential paths, a second terminal of the sixth capacitor coupled to the second terminal of the fourth capacitor.

* * * * *